(No Model.)

A. NOLL.
COUPLING FOR ELECTRIC CONDUITS.

No. 509,603. Patented Nov. 28, 1893.

Attest:
Geo H Botts
M. C. Pinckney

Inventor:
Augustus Noll,
by Wm C Behrend,
atty.

UNITED STATES PATENT OFFICE.

AUGUSTUS NOLL, OF NEW YORK, N. Y., ASSIGNOR TO SIGMUND BERGMANN, OF SAME PLACE.

COUPLING FOR ELECTRIC CONDUITS.

SPECIFICATION forming part of Letters Patent No. 509,603, dated November 28, 1893.

Application filed August 5, 1892. Serial No. 442,266. (No model.)

*To all whom it may concern:*

Be it known that I, AUGUSTUS NOLL, a citizen of the United States, and a resident of New York, in the county of New York and State of New York, have invented certain new and useful Improvements in Coupling Means for and the Combination of the Same with Tubes for Electrical Conductors, of which the following is a specification.

My invention relates to coupling means for, and the combination of the same with, ducts or conduit tubes for electrical conductors, for use in either interior, underground, or other electric service, and the objects of my invention are to construct a coupling which can be easily and quickly applied to conduit tubes or wire ducts and which makes an air and water tight joint. I accomplish these objects by the construction hereinafter described and claimed.

Figure 1:
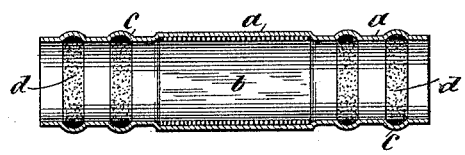
Figure 2:
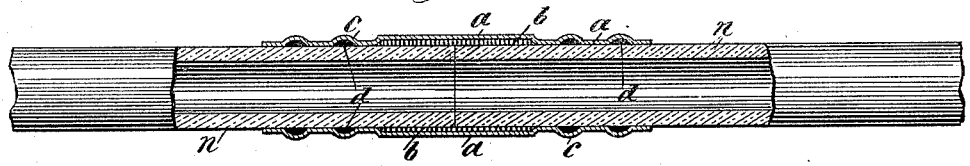
Figure 3:
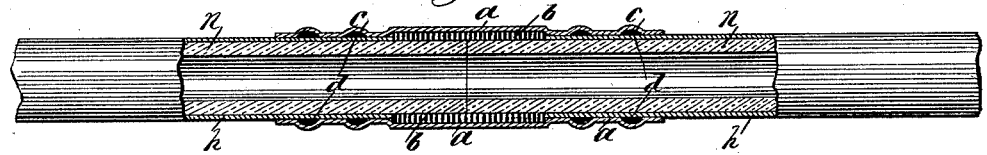
Figure 4:
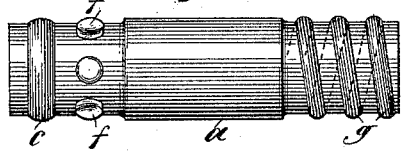

In the accompanying drawings forming part of this specification Figure 1 represents a longitudinal cross-section of a coupling sleeve embodying my invention. Fig. 2 represents my coupling sleeve applied to a wire duct of paper, vulcanite or any other material suitable for the purpose. Fig. 3 represents my coupling sleeve applied to a wire duct of any suitable material having an outside brass covering. Fig. 4 is an exterior view of my coupling sleeve, illustrating also a couple of modifications of construction.

Referring to the drawings $a$ represents the coupling sleeve of brass or any other suitable metal or material. Its central portion is enlarged to receive a short section of an insulating tube $b$ of treated paper or any other insulating material. Its end portions or sections are each provided with an interior groove or grooves $c$ which are filled with an insulating cement $d$ which is solid at ordinary temperatures but liquefies under the application of considerable heat as hereinafter set forth.

Instead of forming circular grooves in the sleeve I may provide the same with a series of cavities or indentations as shown at $f$ in Fig. 4 or I may form a spiral groove in the sleeve as shown at $g$ in the same figure. Instead of forming two grooves in each end section I may form only one, but I prefer to form two, and to use circular grooves, instead of spiral ones or the series of indentations. Either of the several forms shown may be termed a recess.

The insulating cement with which the grooves of the sleeve are filled may be any one of the well known cements now used principally in underground electrical work.

In Fig. 2 I have shown my coupling applied, for example, to a wire duct or tube of vulcanite, or to an interior conduit tube of treated paper, the process of application being as follows: I take the insulated coupling sleeve and insert into the same the adjacent ends of the two sections of tube $n$ to be coupled together, until their ends abut against each other. I then apply heat through the medium of a lamp or otherwise to the end sections of the sleeve in order to melt the cement in the grooves thereof and as said cement melts it flows onto the tube and into any space or spaces that may exist between the tube and sleeve thus cementing the two closely together, so that when the heat is withdrawn and the cement has again become solid a perfectly water tight and air tight joint has been formed.

In practice it has been found that it is impossible to make conduit tubes of perfectly uniform diameter, so that the coupling sleeves do not, therefore, always fit closely enough, even when subsequently compressed thereon, to insure a water tight and air tight joint, but with my invention these differences in diameter are immaterial, and an air tight joint is as readily formed when tube and sleeve fit loosely as when they fit closely.

In Fig. 3 I have illustrated the joining of brass or other metal covered insulating tubes, $h$ representing the metal covering over any kind of insulating tube, the same or different from that described in connection with Fig. 2. In joining sections of such a tube a portion of the brass covering is removed from the ends as shown in said figure but this feature is not of my invention and further description of the same is unnecessary. The application of my coupling sleeve to said brass covered tube is effected in the same manner as before described with reference to Fig. 2, the cement of the grooves cementing the metal covering of the tubes to the surrounding metal sleeve.

Having fully described my invention, what I claim, and desire to secure by Letters Patent, is—

1. A coupling sleeve provided with a central enlarged portion fitted with an insulating tube, and with interior recesses filled with cement, substantially as described.

2. In combination with a coupling sleeve provided with interior recesses and an enlarged portion carrying an insulating tube, adjacent tube sections inserted in said sleeve and a cement located in said recesses which cements the sleeve to said tube sections, substantially as described.

Signed at New York, in the county of New York and State of New York, this 1st day of August, A. D. 1892.

AUGUSTUS NOLL.

Witnesses:
FRANCIS E. FAIRMAN,
WM. CLIFFORD.